US011868080B2

(12) United States Patent
Kadowaki

(10) Patent No.: US 11,868,080 B2
(45) Date of Patent: Jan. 9, 2024

(54) OPEN AND CLOSE DETECTION DEVICE AND IMAGE FORMING APPARATUS

(71) Applicant: SHARP KABUSHIKI KAISHA, Sakai (JP)

(72) Inventor: Hideaki Kadowaki, Osaka (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/960,732

(22) Filed: Oct. 5, 2022

(65) Prior Publication Data

US 2023/0113161 A1 Apr. 13, 2023

(30) Foreign Application Priority Data

Oct. 7, 2021 (JP) ................................. 2021-165305

(51) Int. Cl.
*G03G 21/00* (2006.01)
*G03G 21/16* (2006.01)

(52) U.S. Cl.
CPC . *G03G 21/1633* (2013.01); *G03G 2215/0078* (2013.01); *G03G 2221/1687* (2013.01)

(58) Field of Classification Search
CPC ....... G03G 21/1633; G03G 2215/0078; G03G 2221/1687; H04N 1/00554; H04N 2201/0091; H04N 2201/0094; H01H 9/22; H01H 25/002
USPC .......................................... 399/107, 110, 124
See application file for complete search history.

(56) References Cited

U.S. PATENT DOCUMENTS 9,885,999 B2 * 2/2018 Uohashi .................... H01H 9/22
11,526,097 B2 * 12/2022 Kumagai ........... G03G 21/1633
2002/0041775 A1 * 4/2002 Ishii ....................... H01H 3/161 399/124
2017/0205761 A1 * 7/2017 Mitsui ................ G03G 21/1633
2018/0203406 A1 * 7/2018 Agata ................ G03G 21/1638
2019/0234812 A1 * 8/2019 Kadowaki ............... G01L 1/046

FOREIGN PATENT DOCUMENTS

JP 10199364 A * 7/1998
JP 2005-111896 A 4/2005
JP 2007122000 A * 5/2007 .............. B41J 29/13
JP 2010217474 A * 9/2010 ............. G03G 15/80
JP 2011154240 A * 8/2011 ......... G03G 21/1633
KR 20060136084 A * 1/2007

* cited by examiner

*Primary Examiner* — Robert B Beatty
(74) *Attorney, Agent, or Firm* — ScienBiziP, P.C.

(57) ABSTRACT

According to an embodiment, an open and close detection device is provided with a moving member, a first lever, a second lever, and the like. The moving member is held to be movable by a holding member within a planar area including an initial position and a detection position. Each of the first lever and the second lever includes a contact guide section, and moves the moving member in association with a closing operation of an open and close member. Also, when one of the first lever and the second lever is to move the moving member, this movement is guided by the contact guide section of the other lever.

7 Claims, 17 Drawing Sheets

OPEN AND CLOSE DETECTION DEVICE AND IMAGE FORMING APPARATUS

BACKGROUND OF THE INVENTION

Field of the Invention

The present disclosure relates to an open and close detection device and an image forming apparatus, and more particularly, to an open and close detection device and an image forming apparatus, which detect an open and close state of a first open and close member and a second open and close member provided to be openable and closable in directions orthogonal to each other, for example.

Description of the Background Art

An example of a conventional open and close detection device (a cover open and close detection mechanism) provided are a movable member including two acted surfaces on which a plurality of actuation members act, in which the plurality of actuation members are respectively arranged on inner sides of a plurality of cover members (open and close members) provided to be freely openable and closable on a device body; and a cover open and close detection sensor (a detection switch) provided on the device body. The movable member includes a rotary shaft that is arranged between the two acted surfaces, and is slidable toward the cover open and close detection sensor. When the actuation member is to act on only one acted surface, the movable member rotates about the rotary shaft, and when the actuation member is to act on each of the two acted surfaces, the movable member is slid to actuate the cover open and close detection sensor.

In the conventional technology, as the movable member is slid in a predetermined direction along a sliding groove, the cover open and close detection sensor is turned on or off. However, since the direction of movement of the movable member is different from the opening and closing direction of the cover members, the movable member cannot be moved smoothly when closing one of the cover members while the other cover member is already closed. In particular, if the two cover members are simultaneously closed, the movable member becomes immovable by receiving the mutual reaction force of the two cover members. In the worst-case scenario, the movable member may be damaged.

Therefore, a main object of the present disclosure is to provide an open and close detection device and an image forming apparatus that are novel.

Another object of the present disclosure is to provide an open and close detection device and an image forming apparatus capable of appropriately detecting an open and close state of two open and close members with a single detection switch.

SUMMARY OF THE INVENTION

A first aspect of the present disclosure pertains to an open and close detection device, which detects an open and close state of a first open and close member and a second open and close member provided to be openable and closable in directions orthogonal to each other, and includes: a detection switch; a moving member including a first contact surface and a second contact surface arranged in directions orthogonal to each other; a holding member which holds the moving member to be movable within a planar area including an initial position at which the detection switch is not pressed, and a detection position at which the detection switch is pressed to present a detection state; a first lever which includes a first contact guide section opposed to the first contact surface, and is displaced in association with an opening and closing operation of the first open and close member; a second lever which includes a second contact guide section opposed to the second contact surface, and is displaced in association with an opening and closing operation of the second open and close member; and a biasing member which biases the moving member in a direction from the detection position toward the initial position, and brings the first contact surface into contact with the first contact guide section, and also brings the second contact surface into contact with the second contact guide section. In the open and close detection device, the first lever presses, in accordance with the closing operation of the first open and close member, the first contact surface by the first contact guide section, thereby moving the moving member in a first direction, and when the second lever is to move the moving member, guides the moving member in a second direction orthogonal to the first direction by the first contact guide section; the second lever presses, in accordance with the closing operation of the second open and close member, the second contact surface by the second contact guide section, thereby moving the moving member in the second direction, and when the first lever is to move the moving member, guides the moving member in the first direction by the second contact guide section; and when the first open and close member and the second open and close member are both in the close state, the moving member is moved to the detection position and the detection switch presents the detection state.

According to the first aspect of the present disclosure, the moving member can be moved freely within the planar area, and also, the movement of the moving member by one of the levers is guided by the contact guide section of the other one of the levers. Therefore, the moving member can be smoothly led to the detecting position, while the levers and are kept from exerting reaction forces on each other. Therefore, the open and close state of the two open and close members can be appropriately detected by a single detection switch.

A second aspect of the present disclosure is dependent on the first aspect of the present disclosure, in which an end portion on one side of the biasing member is attached to the moving member, and an end portion on the other side of the biasing member is attached to the holding member.

A third aspect of the present disclosure is dependent on the first or second aspect of the present disclosure, in which the moving member includes a third contact surface at a side surface that is on the same side as the first contact surface, and the holding member includes a guide section which is brought into contact with the third contact surface and guides movement of the moving member in the second direction.

According to the third aspect of the present disclosure, the moving member can be moved more smoothly.

A fourth aspect of the present disclosure is dependent on any one of the first to third aspects of the present disclosure, in which the holding member includes a fall preventer which prevents a fall of the moving member in a direction orthogonal to a direction of movement of the moving member.

According to the fourth aspect of the present disclosure, the moving member can be moved more smoothly.

A fifth aspect of the present disclosure is dependent on any one of the first to fourth aspects of the present disclosure, in which the moving member includes an opening penetrating in a thickness direction thereof, and the holding member includes a protrusion which has a cross-sectional area smaller than that of the opening, and is inserted into the opening.

According to the fifth aspect of the present disclosure, the assembly work of the open and close detection device is facilitated. Also, when the moving member is in the initial position, the posture of the moving member can be stabilized.

A sixth aspect of the present disclosure is dependent on the fifth aspect of the present disclosure, in which each of the opening and the protrusion has a rectangular cross-sectional shape having two sides parallel to the first contact surface and two sides parallel to the second contact surface.

A seventh aspect of the present disclosure pertains to an image forming apparatus including: a first open and close member and a second open and close member provided to be openable and closable in directions orthogonal to each other; and the open and close detection device according to any one of the first to sixth aspects of the present disclosure which detects an open and close state of the first open and close member and the second open and close member.

According to the present disclosure, the moving member can be moved freely within the planar area, and also, the movement of the moving member by one of the levers is guided by the contact guide section of the other one of the levers. Therefore, the moving member can be smoothly led to the detecting position, while the levers and are kept from exerting reaction forces on each other. Therefore, the open and close state of the two open and close members can be appropriately detected by a single detection switch.

The above-described objects, other objects, features, and advantages of the present disclosure will become even more clear from the detailed description of the embodiment given below with reference to the accompanying drawings.

DESCRIPTION OF THE PREFERRED EMBODIMENTS

Embodiments

Figure 1:
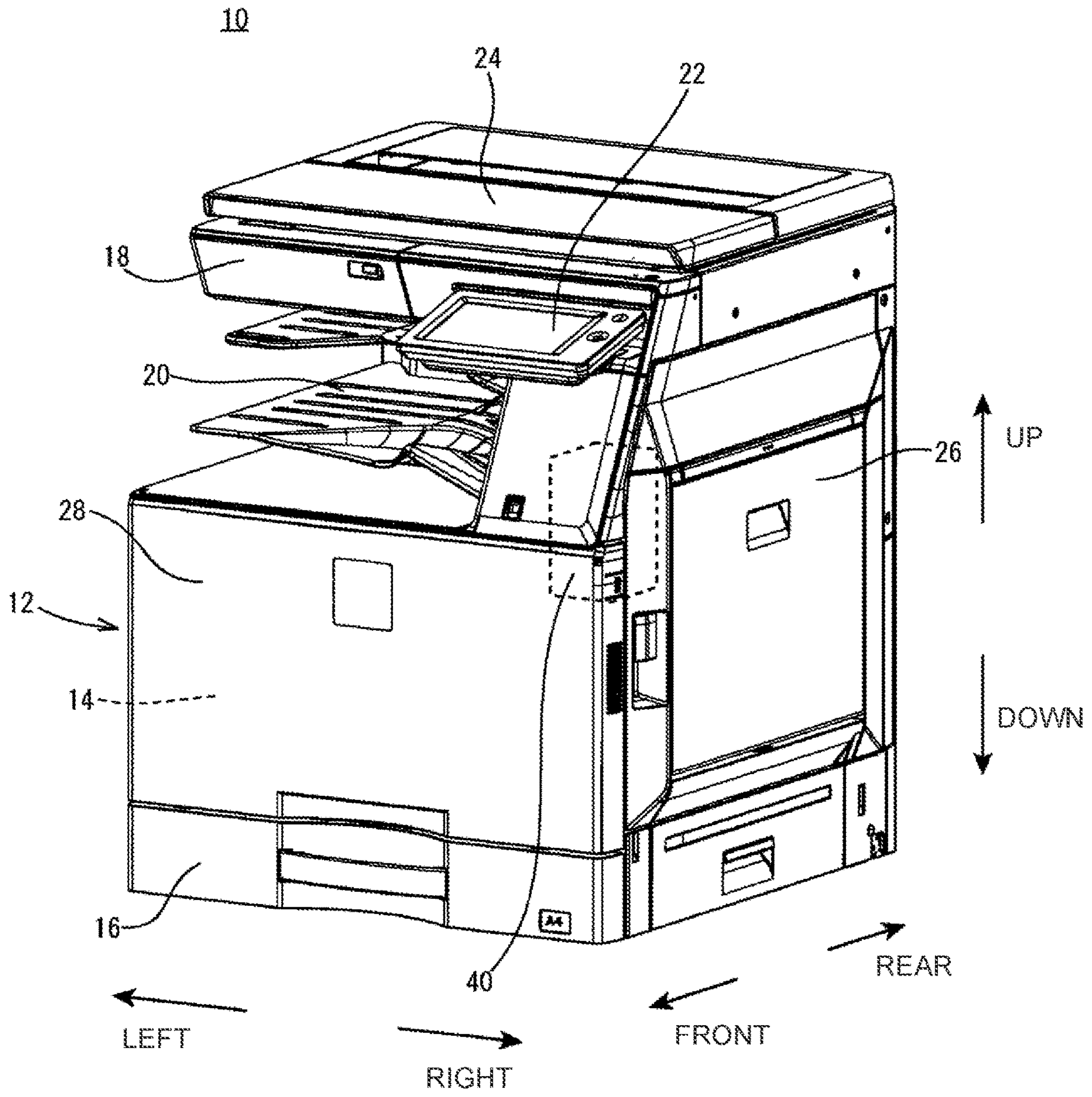
FIG. 1 is a perspective view showing an image forming apparatus provided with an open and close detection device, which is one embodiment of the present disclosure.

Referring to FIG. 1, an image forming apparatus 10 provided with an open and close detection device 40, which is one embodiment of the disclosure, is an apparatus that forms a multicolored or monochromatic image on a sheet of paper (a recording medium) by an electrophotographic method. As will be described in detail below, the image forming apparatus 10 is provided with a right door 26, which is an example of a first open and close member, and a front door 28, which is an example of a second open and close member. Further, the open and close detection device 40 uses a single detection switch 42 to detect an open and close state of the right door 26 and the front door 28.

First, a basic configuration of the image forming apparatus 10 will be briefly described. Note that in the present disclosure, a front-rear direction (depth direction) of the image forming apparatus 10 and constituent elements thereof is defined by assuming that a surface opposed to a user's standing position, in other words, a surface on the side on which an operation panel 22 is provided, is a front surface (the front). Further, a left-right direction (horizontal direction) of the image forming apparatus 10 and the constituent elements thereof is defined with reference to a state in which the image forming apparatus 10 is seen from the user.

As illustrated in FIG. 1, the image forming apparatus 10 is a multifunction peripheral having a printer function, a facsimile function, a copy function, and a scanner function, etc. The image forming apparatus 10 includes an apparatus body 12 provided with an image former 14 and a paper feeding device 16, and an image reading device 18 disposed above the apparatus body 12.

The image former 14 is provided with an exposure unit, a developing device, a photoreceptor drum, a charger, an intermediate transfer belt, a transfer roller, a fusing unit, and the like. The image former 14 forms, by the electrophotographic method, an image on paper that is conveyed from the paper feeding device 16 disposed below the image former 14. In other words, the image former 14 forms, by means of the charger and the exposure unit, etc., an electrostatic latent image corresponding to image data on the photoreceptor drum, and makes the electrostatic latent image on the photoreceptor drum visible, by means of the developing device, with toner. Further, the image former 14 transfers, by means of the intermediate transfer belt and the transfer roller, etc., a toner image formed on the photoreceptor drum to the paper, and thermally fuses, by means of the fusing unit, the toner image transferred onto the paper. Furthermore, the image former 14 discharges the paper on which an image has been formed to an in-body paper discharger 20. As the image data for forming the image on the paper, image data that has been read by the image reading device 18, or image data that has been transmitted from an external computer, and so on, is used.

Also, although not illustrated in the drawings, a controller, which controls the operation of each part of the image forming apparatus 10, is provided at a predetermined position inside the apparatus body 12. The controller includes a CPU and a memory, etc., and transmits, in response to an input operation to the operation panel 22 by the user, a control signal to each part of the image forming apparatus 10, and causes the image forming apparatus 10 to execute various operations.

The image reading device 18 is provided with a housing including, on an upper surface of the housing, a document placement table formed of a transparent material. Inside the housing, a light source, a plurality of mirrors, an imaging lens, a line sensor, and the like, are provided. The image reading device 18 exposes the surface of a document to light by the light source, and guides reflected light, which is the light reflected from the surface of the document, to the imaging lens by the plurality of mirrors. Then, the reflected light is focused on a light receiving element of the line sensor by the imaging lens, for imaging. The line sensor detects the luminance and chromaticity of the reflected light focused on the light receiving element for imaging, and generates image data based on an image on the surface of the document. As the line sensor, a charge-coupled device (CCD) or a contact image sensor (CIS), etc., is used.

On a front surface side of the image reading device 18, the operation panel 22 is provided to be rotatable in an up-down direction. The operation panel 22 is also referred to as an operation device or an operation unit, and is formed in a horizontally long rectangular plate shape. On the operation panel 22, a display such as a touch panel display, and various hardware keys (operation buttons), etc., are provided as appropriate. Also, on an upper surface of the image reading device 18, a document retaining cover 24 is attached to be freely openable and closable via a hinge or the like arranged at the back side. The document retaining cover 24 may be provided with an automatic document feeder (ADF) that automatically feeds documents, one sheet at a time, to an image reading position of the image reading device 18.

Also, the apparatus body 12 is provided with two open and close members that can be opened and closed in directions orthogonal to each other. That is, on a right side surface of the apparatus body 12, the right door 26 which opens and closes in the left-right direction is provided. Further, on a front surface of the apparatus body 12, the front door 28 which opens and closes in the front-rear direction is provided.

The right door 26 is an upper-side-opening door whose upper side opens by being rotated rightward, with the lower part being a pivot point. The right door 26 is used, for example, to remove paper stopped in the middle of a paper conveyance path of the image former 14. On an inner surface side of the right door 26, a first actuation projection 30 (FIG. 3) is formed at a position corresponding to a first acted part 78 of a first lever 46 to be described later. The first actuation projection 30 includes, on an upper surface thereof, an inclined surface 30*a* that is sloped upward in the right direction. Meanwhile, the front door 28 is an upper-side-opening door whose upper side opens by being rotated frontward, with the lower part being a pivot point. The front door 28 is used when replacing a toner cartridge, and the like. On an inner surface side of the front door 28, a second actuation projection 32 (FIG. 3) is formed at a position corresponding to a second acted part 84 of a second lever 48 to be described later.

Further, at a corner part on a front-right side within the apparatus body 12, in other words, at a corner part between the right door 26 and the front door 28, the open and close detection device 40 is provided. The open and close detection device 40 is a device which detects an open and close state of the right door 26 and the front door 28, and is used to prevent a trouble caused by forgetting to close the right door 26 and the front door 28, or leaving these doors in a half-open state. In the following, a configuration of the open and close detection device 40 will be specifically described.

Figure 2:
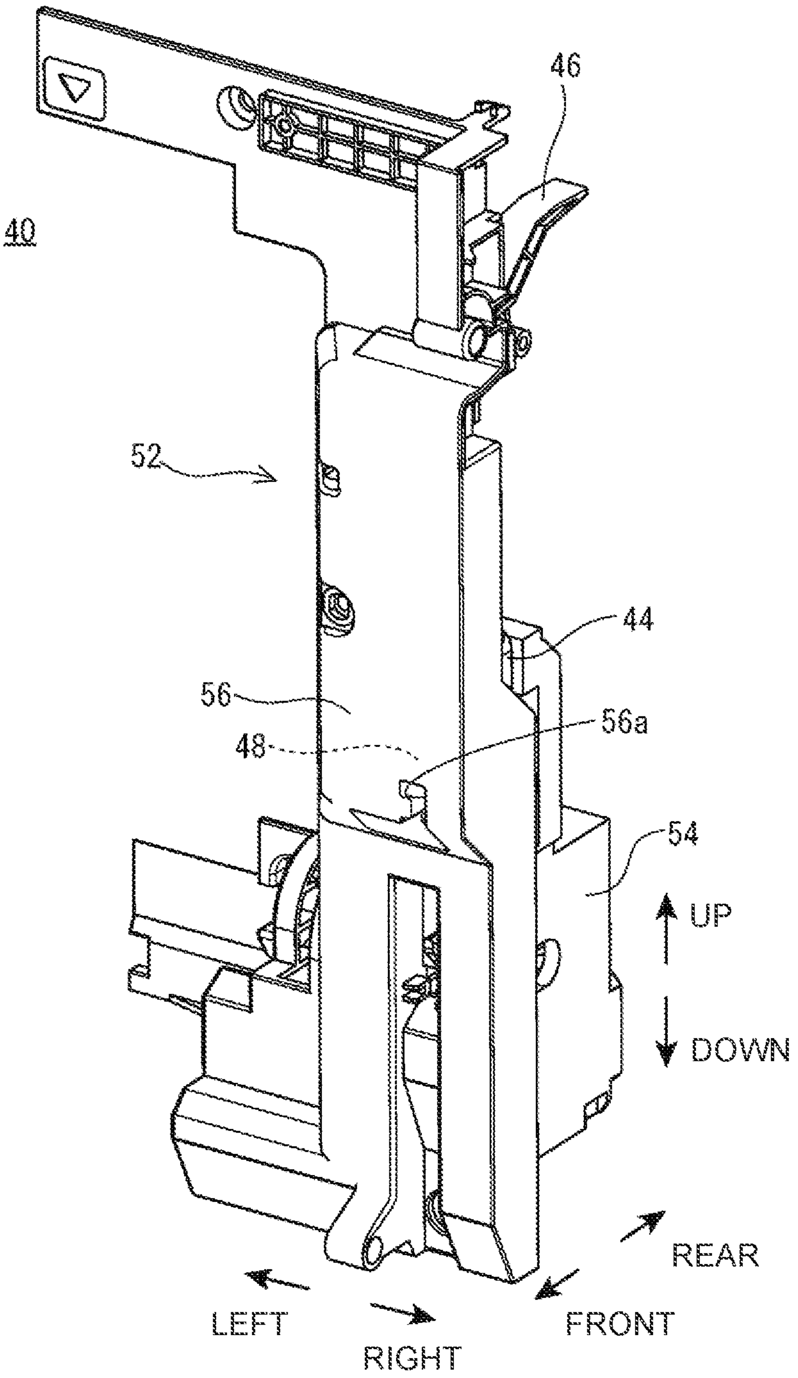
FIG. 2 is a perspective view showing the open and close detection device.
Figure 3:
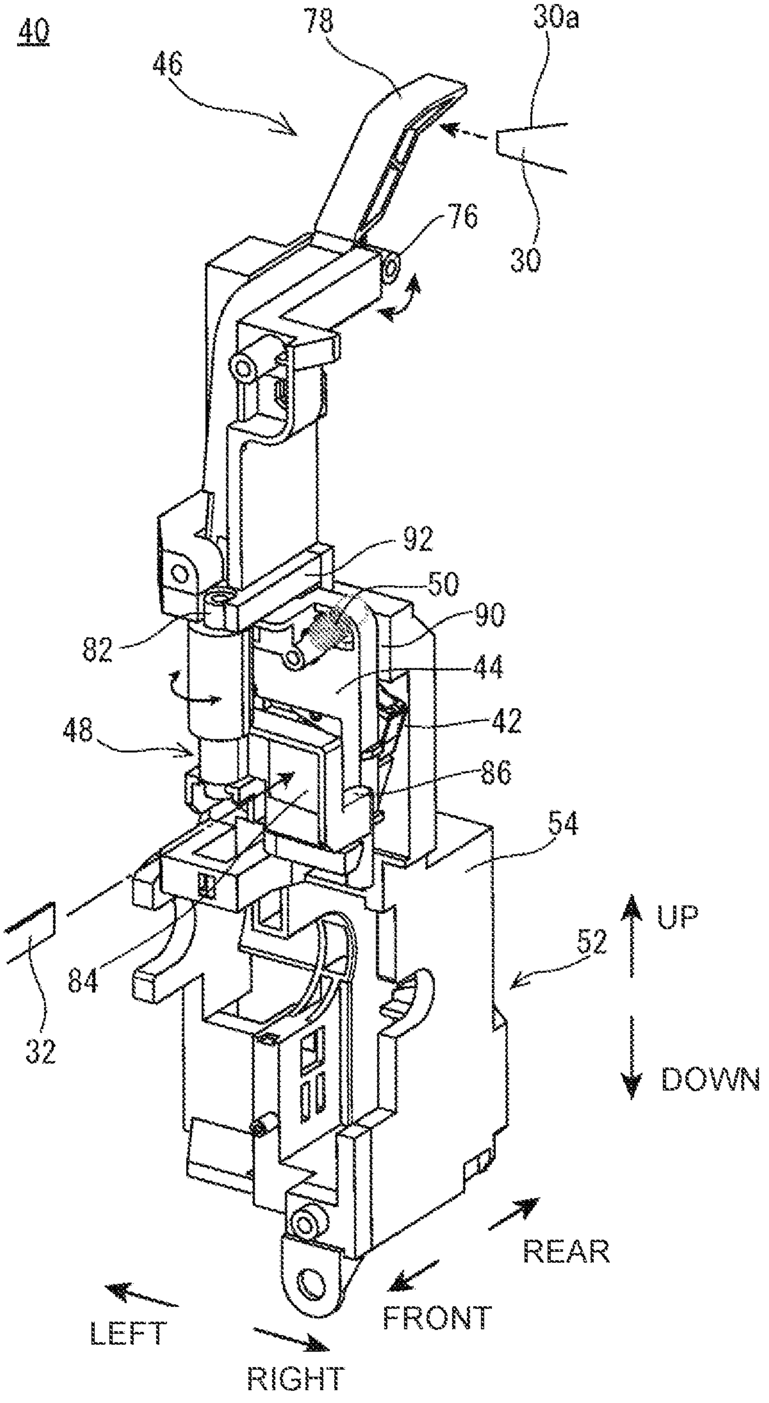
FIG. 3 is a perspective view showing the open and close detection device from which a front frame is removed.

As illustrated in FIGS. 2 and 3, the open and close detection device 40 is provided with the detection switch 42, a moving member 44, the first lever 46, the second lever 48, an extension coil spring 50, and the like, and these elements are held in a predetermined arrangement state with a holding member 52. The holding member 52 includes, for example, a rear frame 54 arranged on a rear side, and a front frame 56 arranged on a front side. Also, an insertion hole 56*a* into which the second actuation projection 32 is inserted is formed in the front frame 56.

Figure 14:
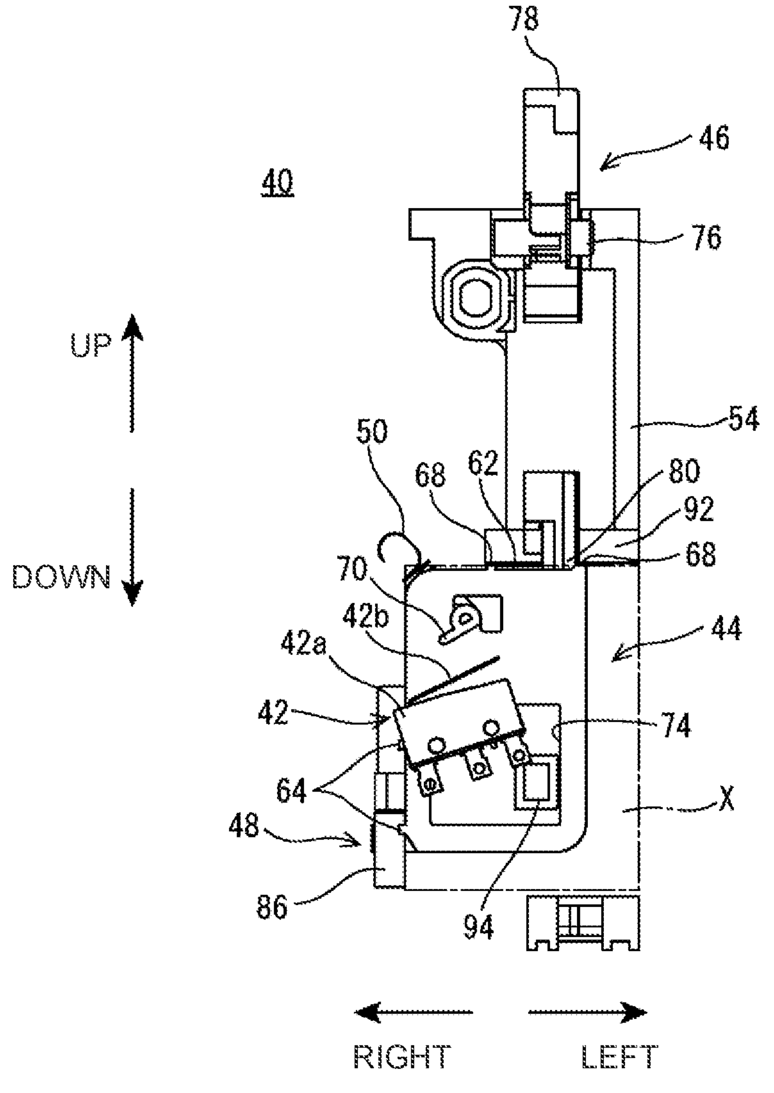
FIG. 14 is an explanatory diagram illustrating the state of the moving member when the right door and the front door are both in an open state (i.e., the state of being at the initial position), as seen from the back side.

The detection switch 42 (an interlock switch) is a known limit switch, and is fixed and mounted on the rear frame 54 using a fastening member, such as a screw. The detection switch 42 includes a switch body 42*a*, and an actuation bar 42*b* (FIG. 14). The actuation bar 42*b* is biased in a direction of being separated from the switch body 42*a*, and when a distal end portion of the actuation bar 42*b* comes to a position close to the switch body 42*a* against the biasing force, a switch portion of the switch body 42*a* is connected to present an ON state (detection state). A signal (ON signal) indicating the ON state of the detection switch 42 is output to the controller of the image forming apparatus 10. The controller determines, on the basis of the presence or absence of the ON signal, whether the detection switch 42 is in the ON state (in other words, whether the right door 26 and the front door 28 are both in the close state).

The moving member 44 is a member which comes close to or separates from the detection switch 42 in accordance with the opening and closing operation of the right door 26 and the front door 28, so as to switch between ON and OFF of the detection switch 42. The moving member 44 is held, on a front side of the detection switch 42, to be movable within a planar area X (FIG. 14) by the rear frame 54.

The planar area X is an area extending in the up-down and left-right directions, and includes an initial position (FIGS. 10 and 14) at which the moving member 44 does not press the detection switch 42, and a detection position (FIGS. 13 and 17) at which the moving member 44 presses the detection switch 42 to present the detection state. On the rear frame 54 of the holding member 52, a fall preventer 90 is formed at a position opposed to the upper part on the back of the moving member 44. The fall preventer 90 restricts the movement of the moving member 44 toward the rear, in other words, in a direction orthogonal to the direction of movement of the moving member 44 (i.e., the up-down and left-right directions). By this feature, the fall preventer 90 prevents the moving member 44 from falling backward.

Figure 4:
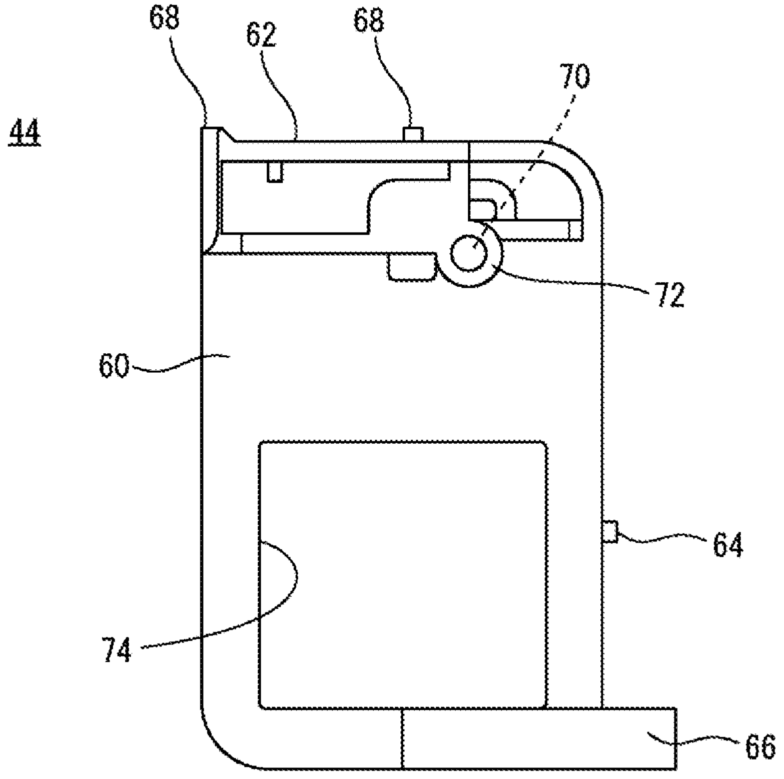
FIG. 4 is a front view showing a moving member provided in the open and close detection device.
Figure 5:
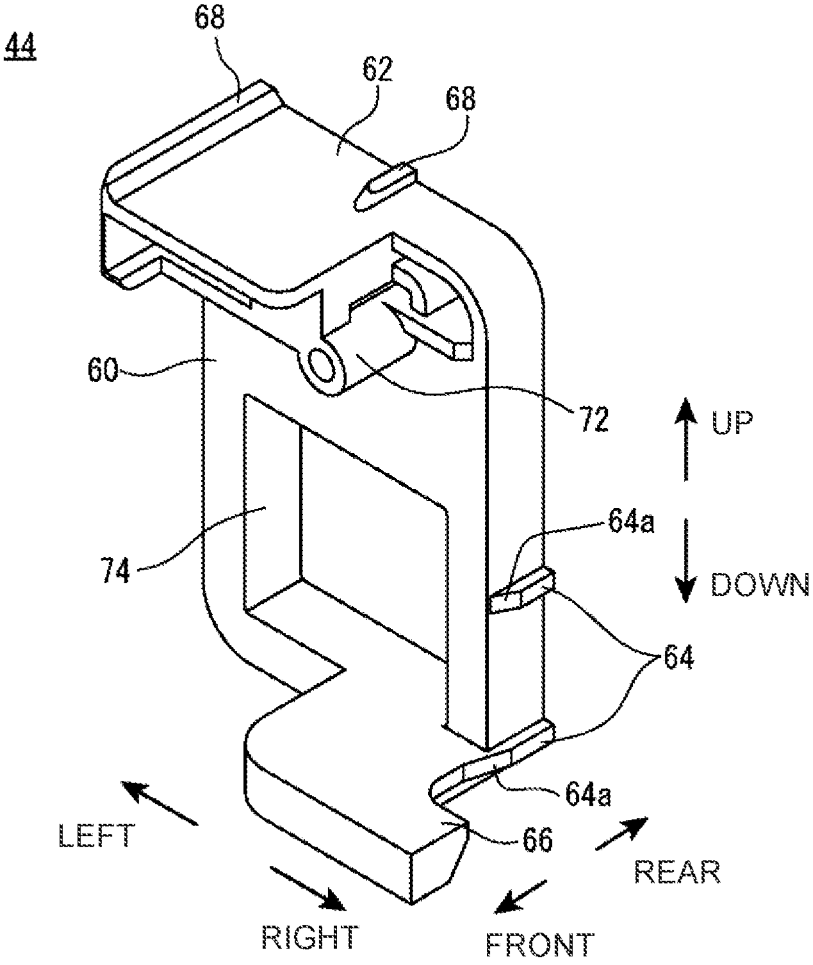
FIG. 5 is a perspective view showing the moving member.

As illustrated in FIGS. 4 and 5, the moving member 44 includes a base body 60 which is formed in a substantially rectangular plate shape. The base body 60 includes a first contact surface 62 and a second contact surface 64, which are arranged in directions orthogonal to each other. More specifically, on an upper surface of the base body 60, the first contact surface 62 which is brought into contact with a first contact guide section 80 of the first lever 46 to be described later is formed, and on a right side surface of the base body 60, the second contact surface 64, which is brought into contact with a second contact guide section 86 of the second lever 48 to be described later is formed. In the present embodiment, a distal end surface (right side) of each of two projections, which are formed side by side in the up-down direction on the right side surface of the base body 60, corresponds to the second contact surface 64, and a front end portion of the second contact surface 64 is formed as an inclined surface 64*a* that is sloped upward toward the rear. Also, on a lower end portion of the base body 60 (i.e., at the front of the second contact surface 64 on the lower side), an engagement part 66, with which the second contact guide section 86 of the second lever 48 is engaged when the front door 28 is opened, is formed. Further, on the upper surface of the base body 60, a third contact surface 68, which is brought into contact with a guide section 92 (FIG. 3) formed on the rear frame 54, is formed on both the left and right sides of the first contact surface 62. In the present embodiment, a distal end surface (upper surface) of each of two projections formed on both the left and right sides of the first contact surface 62 corresponds to the third contact surface 68.

Moreover, on the back side of the base body 60, a pressure portion 70 (FIG. 14) is provided to protrude toward the rear. The pressure portion 70 is the part which presses and displaces the actuation bar 42*b* of the detection switch 42. Further, at an upper right part on a front surface side of the base body 60, an engagement part 72, with which an end portion on one side of the extension coil spring 50 is engaged, is formed.

In addition, at a lower part of the base body 60 (in other words, at a position opposite to the engagement part 72 in a biasing direction of the extension coil spring 50), an opening 74, which penetrates through the base body 60 in a thickness direction thereof, is formed. Meanwhile, on the holding member 52, a protrusion 94 (FIG. 14) which is inserted into the opening 74 is formed. A cross-sectional area of the protrusion 94 is set to a size smaller than a cross-sectional area of the opening 74 so as not to obstruct the movement of the moving member 44 within the planar area X. Also, in the present embodiment, the opening 74 and the protrusion 94 are each formed to have a rectangular cross-sectional shape having two sides parallel to the first contact surface 62 and two sides parallel to the second contact surface 64. The opening 74 and the protrusion 94 as described above are used, for example, to temporarily fix the moving member 44 when the moving member 44 is to be attached to the holding member 52. By virtue of the above feature, the assembly work of the open and close detection device 40 is facilitated. Also, when the moving member 44 is in the initial position, as the opening 74 is engaged by the protrusion 94, the posture of the moving member 44 can be stabilized.

Figure 6:
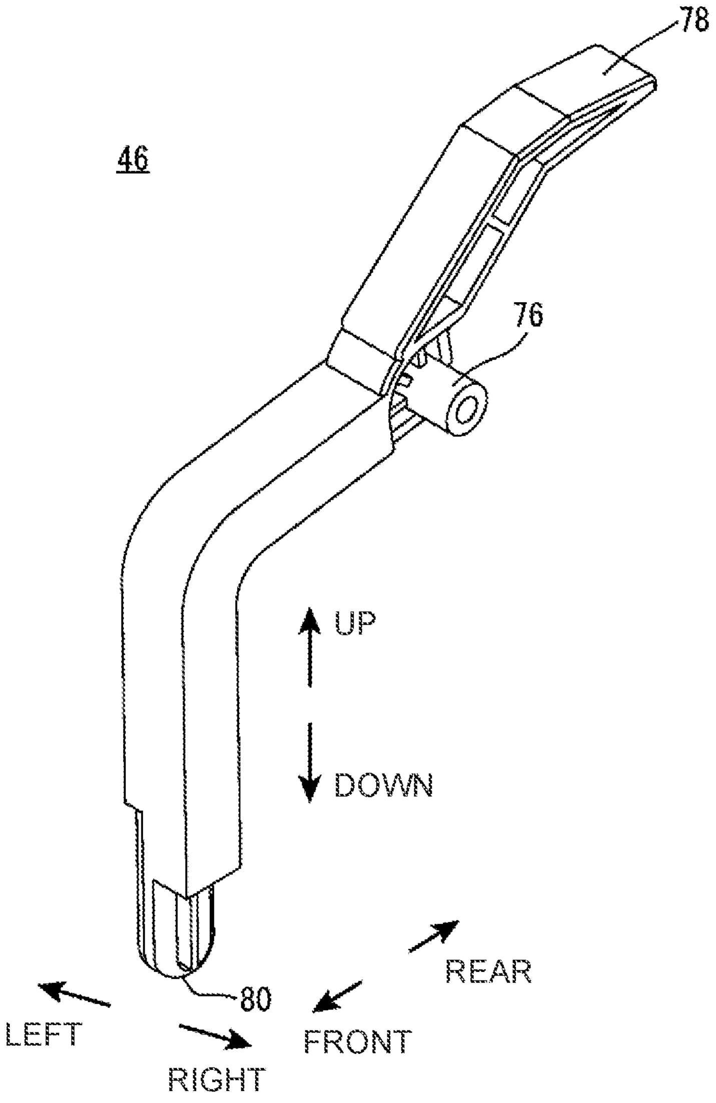
FIG. 6 is a perspective view showing a first lever provided in the open and close detection device.

Now referring to FIG. 6, together with FIGS. 2 and 3, the first lever 46 is a member which is displaced in association with the opening and closing operation of the right door 26, and moves the moving member 44 in a predetermined first direction, in accordance with the closing operation of the right door 26. Specifically, the first lever 46 is attached to the rear frame 54 to be rotatable about a support shaft 76 extending in the left-right direction. An end portion on one side (an upper end portion) of the first lever 46 is arranged at a position corresponding to the first actuation projection 30 of the right door 26, and the first acted part 78 in a plate shape extending in the front-rear direction is formed at this end portion on one side. Meanwhile, an end portion on the other side (a lower end portion) of the first lever 46 is arranged at a position opposed to the first contact surface 62 of the moving member 44, and the first contact guide section 80 in a rod shape extending in the up-down direction is formed at this end portion on the other side.

Figure 7:
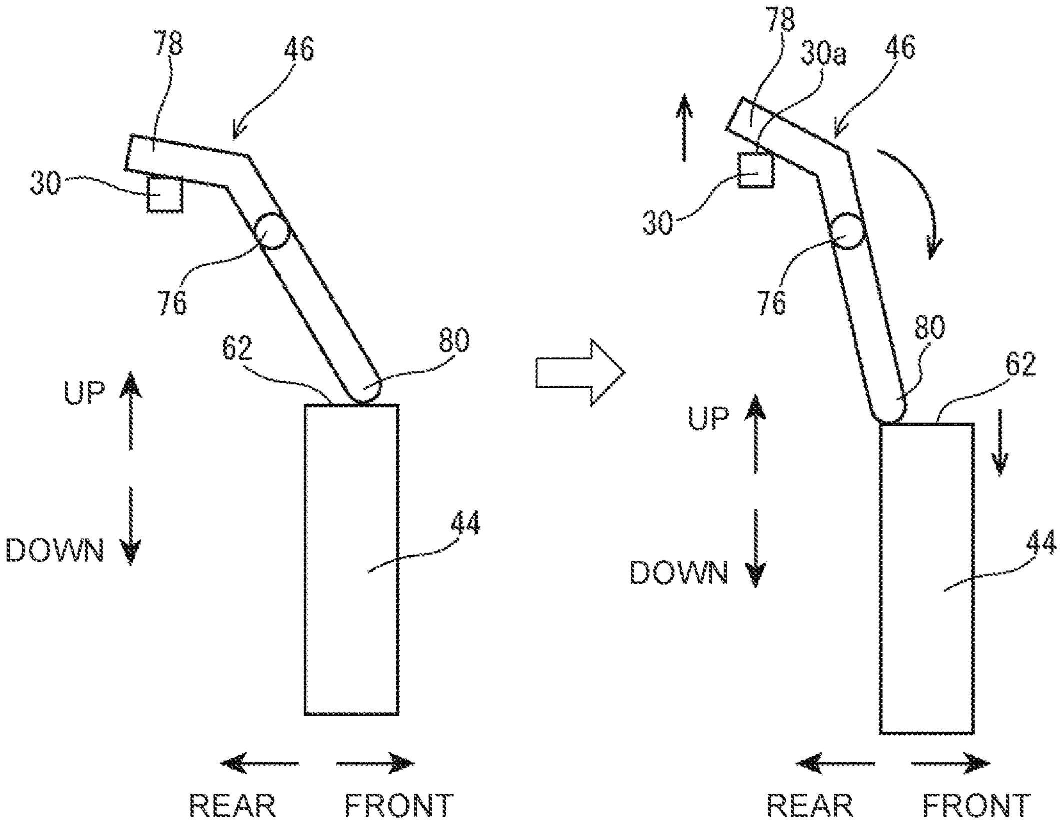
FIG. 7 is an explanatory diagram schematically illustrating the way in which the moving member is moved by the first lever.

The first lever 46 as described above makes such a movement that, as can be well understood from FIGS. 3 and 7, the first acted part 78 is pushed up by the inclined surface 30*a* of the first actuation projection 30, as the first actuation projection 30 is moved to slide under the first acted part 78 at the time of the closing operation of the right door 26. In accordance with this movement, the first lever 46 is rotated and the first contact guide section 80 is moved downward, and a distal end surface of the first contact guide section 80 presses the first contact surface 62 of the moving member 44. The first lever 46 thereby moves the moving member 44 downward (first direction), which is the direction orthogonal to the first contact surface 62 (in other words, the direction parallel to the second contact surface 64). More specifically, in the present embodiment, the first lever 46 converts the force by which the first actuation projection 30 is moved leftward into downward force, and transmits this force to the moving member 44.

Figure 8:
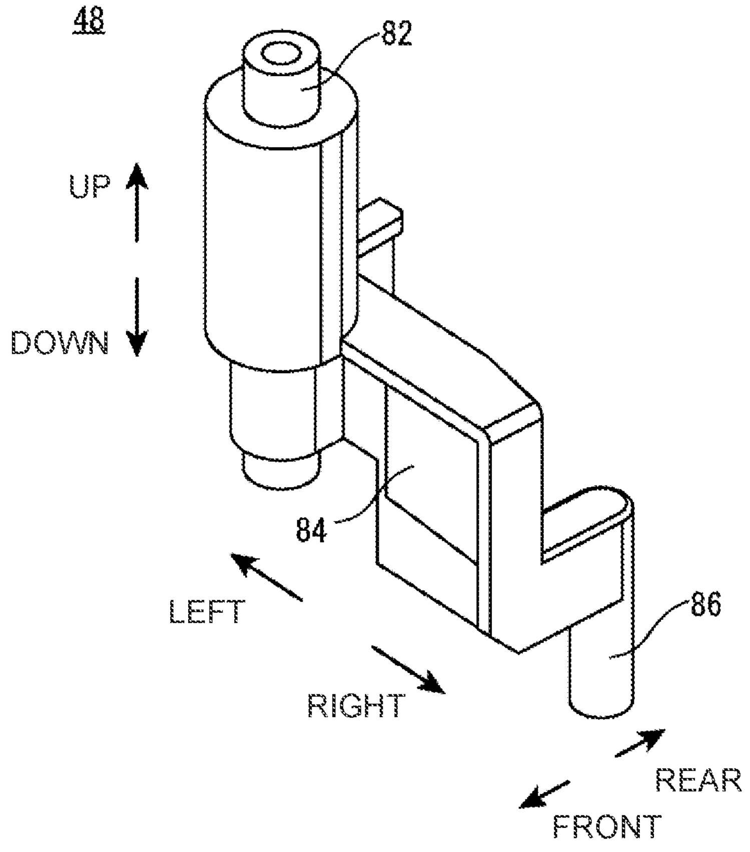
FIG. 8 is a perspective view showing a second lever provided in the open and close detection device.

Now referring to FIG. 8, together with FIGS. 2 and 3, the second lever 48 is a member which is displaced in association with the opening and closing operation of the front door 28, and moves the moving member 44 in a second direction orthogonal to the first direction, in accordance with the closing operation of the front door 28. Specifically, the second lever 48 is attached to the rear frame 54 to be rotatable about a support shaft 82 extending in the up-down direction. The second lever 48 includes the second acted part 84 in a flat-plate shape extending rightward from the support shaft 82. The second acted part 84 is arranged at a position corresponding to the second actuation projection 32 of the front door 28. Also, the second contact guide section 86 in a cylindrical shape, which extends in the up-down direction, is formed to be extended rearward from a right end portion of the second acted part 84. The second contact guide section 86 is arranged at a position opposed to the second contact surface 64 of the moving member 44.

Figure 9:
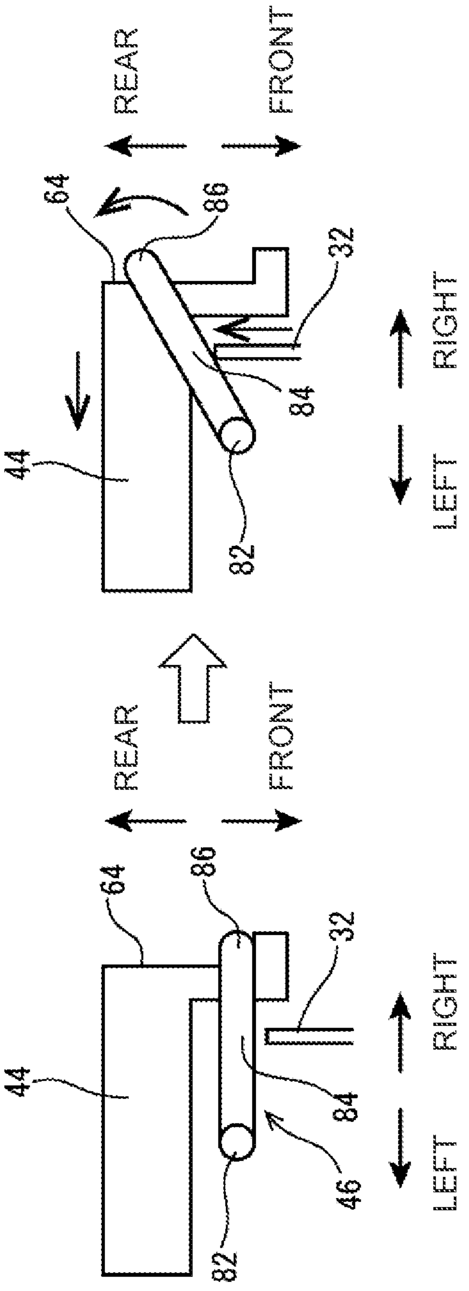
FIG. 9 is an explanatory diagram schematically illustrating the way in which the moving member is moved by the second lever.

The second lever 48 as described above makes such a movement that, as can be well understood from FIGS. 3 and 9, the second acted part 84 is pushed rearward by the second actuation projection 32 at the time of the closing operation of the front door 28. In accordance with this movement, the second lever 48 is rotated and the second contact guide section 86 is moved to the left rear, and a side surface of the second contact guide section 86 presses the second contact surface 64 of the moving member 44. The second lever 48 thereby moves the moving member 44 leftward (second direction), which is the direction orthogonal to the second contact surface 64 (in other words, the direction parallel to the first contact surface 62). More specifically, in the present embodiment, the second lever 48 converts the force by which the second actuation projection 32 is moved rearward into leftward force, and transmits this force to the moving member 44.

Returning to FIG. 3, the extension coil spring 50, which is an example of a biasing member, is a member that biases the moving member 44 in the upper right direction corresponding to the direction from the detection position toward the initial position (in other words, the direction intersecting the first contact surface 62 and the second contact surface 64). An end portion on one side of the extension coil spring 50 is engaged with the engagement part 72 of the moving member 44, and an end portion on the other side of the extension coil spring 50 is engaged with an engagement part (not shown) formed on the holding member 52.

The extension coil spring 50 as described above biases the moving member 44 in the upper right direction, and brings the first contact surface 62 of the moving member 44 into contact with the first contact guide section 80 of the first lever 46, and also brings the second contact surface 64 of the moving member 44 into contact with the second contact guide section 86 of the second lever 48. In addition, in a state in which forces from the first actuation projection 30 of the right door 26 and the second actuation projection 32 of the front door 28 are not acting on the first lever 46 and the second lever 48, respectively, the extension coil spring 50 moves the moving member 44 back to the initial position, and also moves, in accordance with this movement, the first lever 46 and the second lever 48 back to the original states (i.e., the states before moving the moving member 44).

Next, referring to FIGS. 10 to 17, the operation of the open and close detection device 40 will be described. However, FIGS. 10 to 13 are schematic diagrams for illustrating the operation of the open and close detection device 40 in an easily understood manner, and the positions and the like of the pressure portion 70 and the opening 74 formed in the moving member 44 are different from the actual positions.

Figure 10:
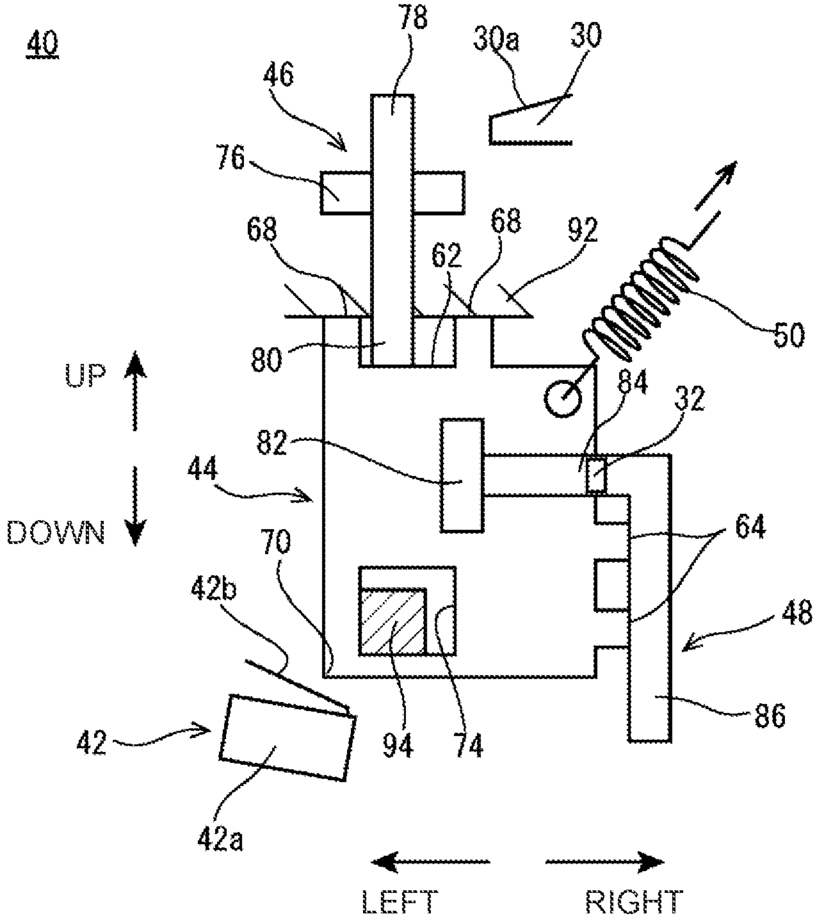
FIG. 10 is an explanatory diagram schematically illustrating the state of the moving member when a right door and a front door are both in an open state (i.e., the state of being at an initial position), as seen from the front side.

As illustrated in FIGS. 10 and 14, when the right door 26 and the front door 28 are both in the open state, as the extension coil spring 50 biases the moving member 44 in the upper right direction, the moving member 44 is held in the initial position (the upper right position in the planar area X) in which the pressure portion 70 is most separated from the detection switch 42. In other words, the detection switch 42 presents the OFF state (non-detection state). In this case, as the first contact surface 62, the second contact surface 64, and the third contact surface 68 of the moving member 44 are in contact with the first contact guide section 80, the second contact guide section 86, and the guide section 92, respectively, and the opening 74 is engaged with the protrusion 94, the posture of the moving member 44 can be stabilized.

Figure 11:
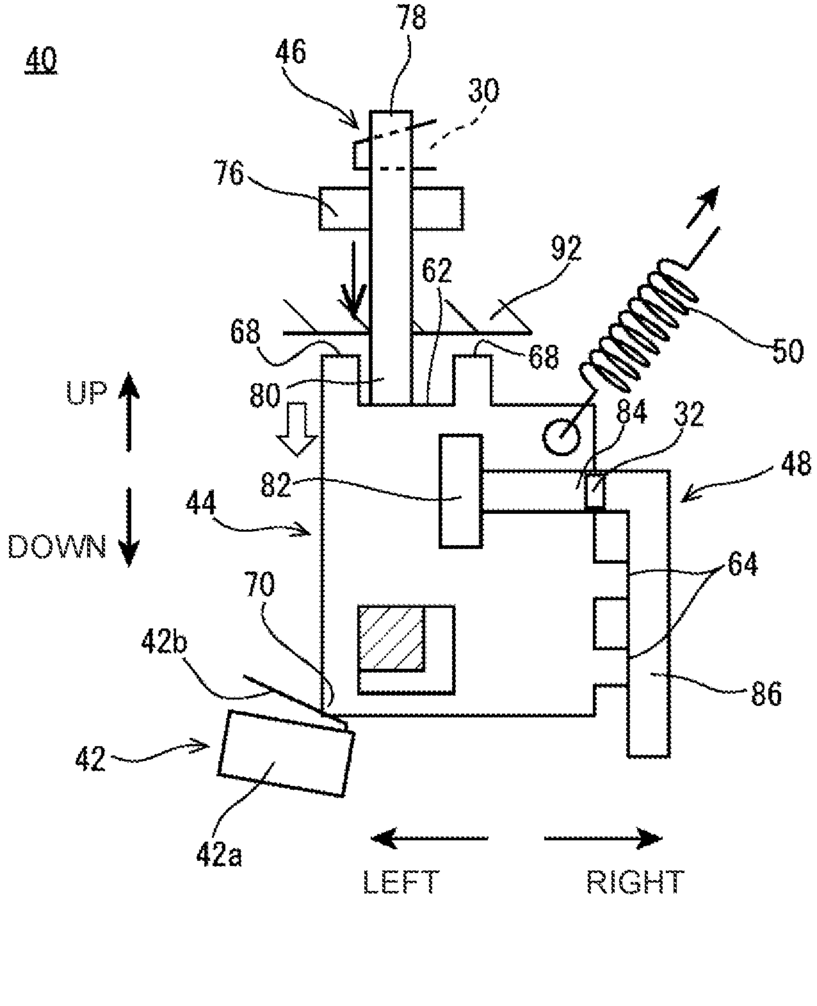
FIG. 11 is an explanatory diagram schematically illustrating the state of the moving member when the right door is in a close state, and the front door is in an open state, as seen from the front side.
Figure 15:
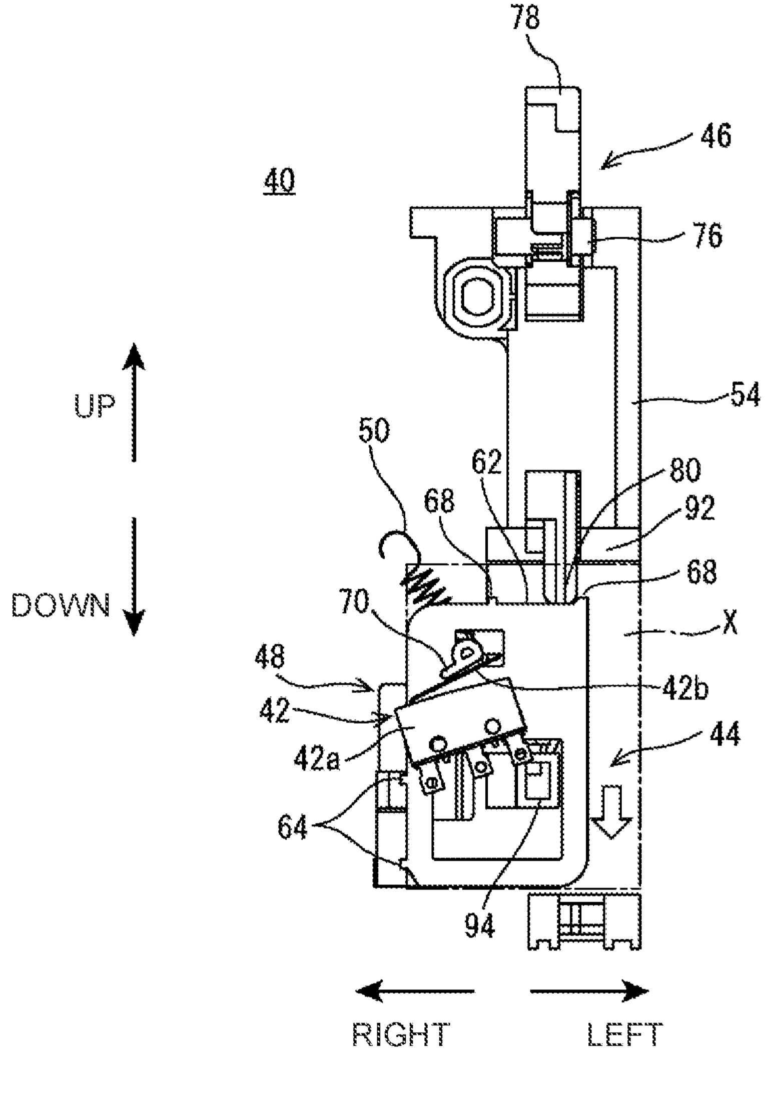
FIG. 15 is an explanatory diagram illustrating the state of the moving member when the right door is in a close state, and the front door is in an open state, as seen from the back side.

As illustrated in FIGS. 11 and 15, when the right door 26 is in the close state and the front door 28 is in the open state, the moving member 44 is placed in a state of having been pushed down by the first lever 46, and the moving member 44 is held at the lower right position in the planar area X. In a state in which the moving member 44 is at the lower right position, the distal end portion of the actuation bar 42*b* is separated from the switch body 42*a*, and the detection switch 42 presents the OFF state (non-detection state).

Incidentally, when the right door 26 is to be closed (during a transition from the open state to the close state), the first contact guide section 80 of the first lever 46 presses the first contact surface 62 of the moving member 44, and the moving member 44 is thereby moved downward (first direction) against the biasing force of the extension coil spring 50. In this case, as the second contact guide section 86 of the second lever 48 is in contact with the second contact surface 64 of the moving member 44, the second contact guide section 86 restricts the rightward movement of the moving member 44, and appropriately guides the moving member 44 downward. In addition, a fall of the moving member 44 is prevented by means of the fall preventer 90 of the holding member 52. Consequently, the moving member 44 can be moved smoothly downward.

Figure 12:
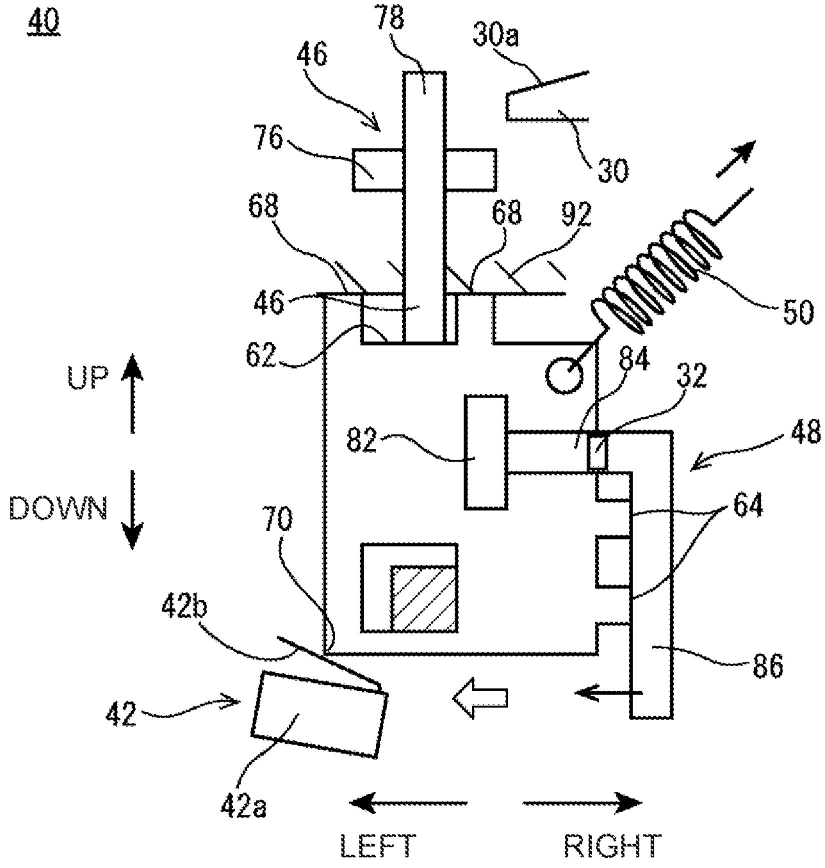
FIG. 12 is an explanatory diagram schematically illustrating the state of the moving member when the right door is in an open state, and the front door is in a close state, as seen from the front side.
Figure 16:
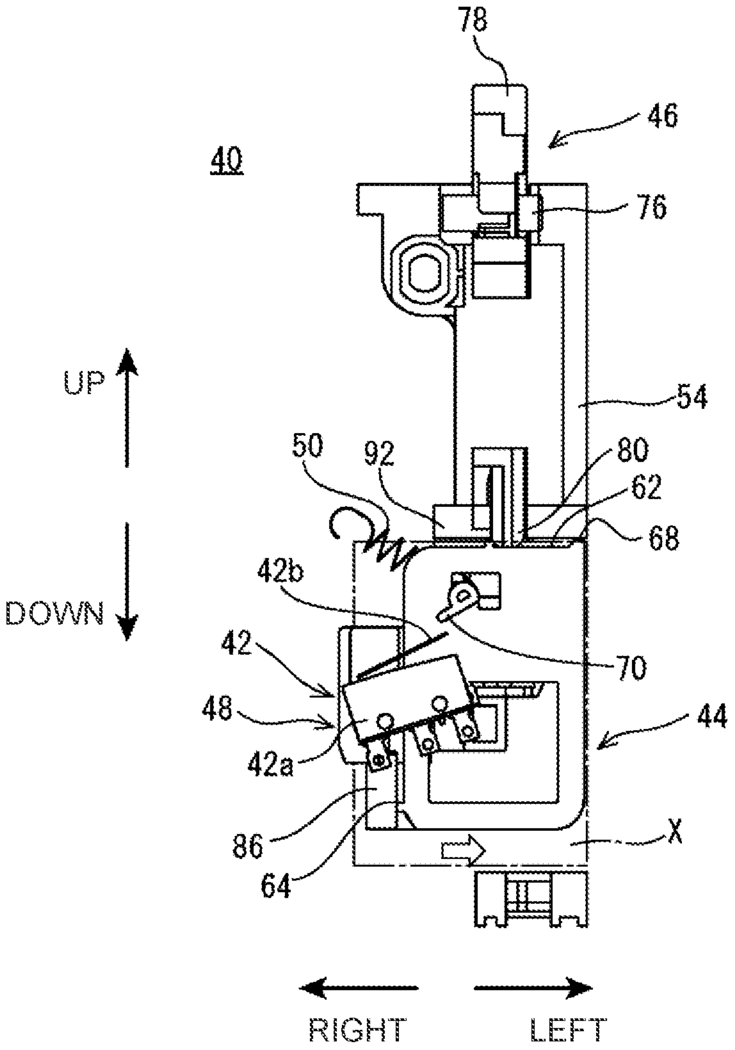
FIG. 16 is an explanatory diagram illustrating the state of the moving member when the right door is in an open state, and the front door is in a close state, as seen from the back side.

As illustrated in FIGS. 12 and 16, when the right door 26 is in the open state and the front door 28 is in the close state, the moving member 44 is placed in a state of having been moved leftward by the second lever 48, and the moving member 44 is held at the upper left position in the planar area X. In a state in which the moving member 44 is at the upper left position, the distal end portion of the actuation bar 42*b* is separated from the switch body 42*a*, and the detection switch 42 presents the OFF state.

Incidentally, when the front door 28 is to be closed, the second contact guide section 86 of the second lever 48 presses the second contact surface 64 of the moving member 44, and the moving member 44 is thereby moved leftward (second direction) against the biasing force of the extension coil spring 50. In this case, as the first contact guide section 80 of the first lever 46 is in contact with the first contact surface 62 of the moving member 44, the first contact guide section 80 restricts the upward movement of the moving member 44, and appropriately guides the moving member 44 leftward. Similarly, as the guide section 92 of the holding member 52 is in contact with the third contact surface 68 of the moving member 44, the guide section 92 restricts the upward movement of the moving member 44, and guides the moving member 44 leftward. In addition, a fall of the moving member 44 in the rear direction is prevented by means of the fall preventer 90 of the holding member 52. Consequently, the moving member 44 can be moved smoothly leftward.

Figure 13:
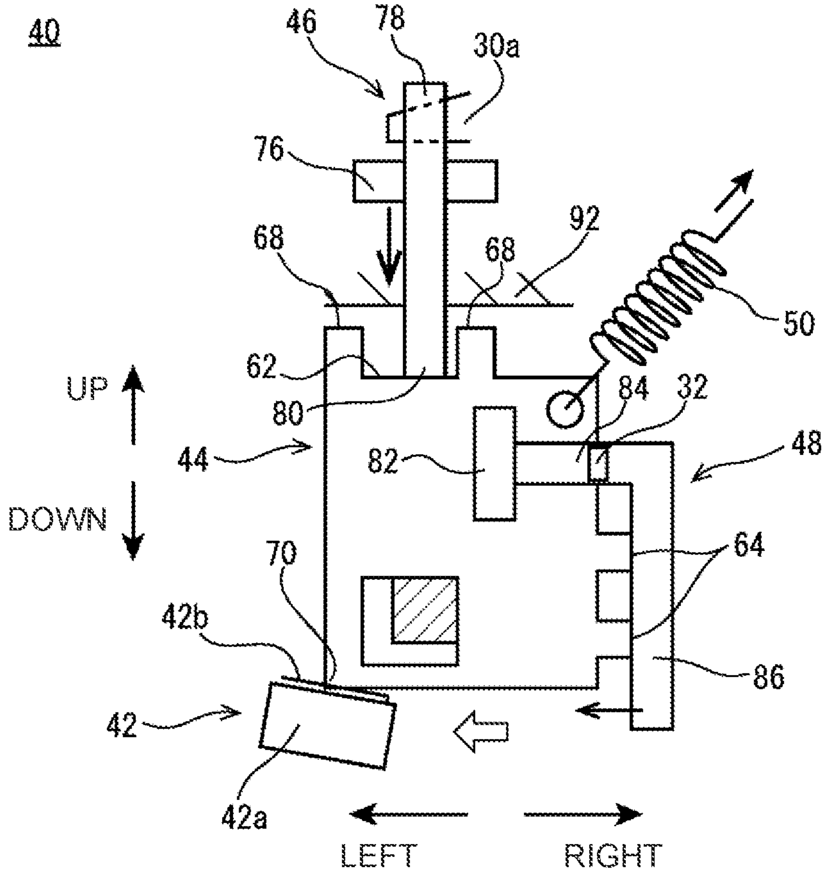
FIG. 13 is an explanatory diagram schematically illustrating the state of the moving member when the right door and the front door are both in a close state (i.e., the state of being at a detection position), as seen from the front side.
Figure 17:
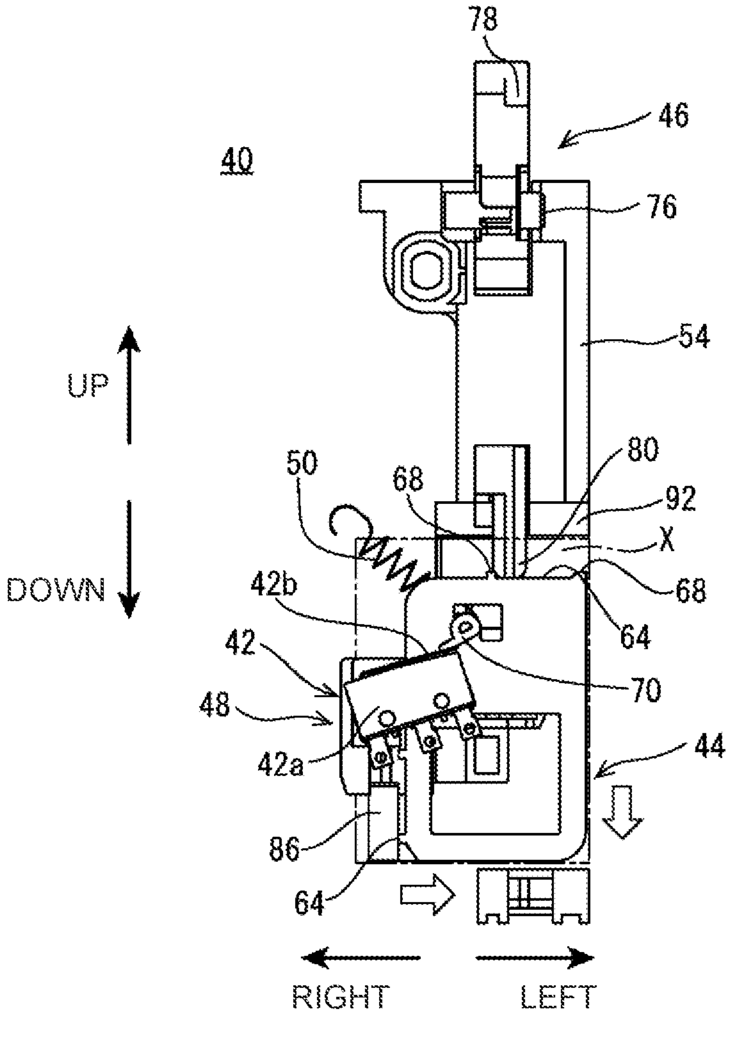
FIG. 17 is an explanatory diagram illustrating the state of the moving member when the right door and the front door are both in a close state (i.e., the state of being at the detection position), as seen from the back side.

Further, as illustrated in FIGS. 13 and 17, when the right door 26 and the front door 28 are both in the close state, the moving member 44 is placed in a state of having been moved downward and leftward by the first lever 46 and the second lever 48, and the moving member 44 is held in the detection position (the lower left position in the planar area X) at which the pressure portion 70 presses the detection switch 42. In other words, the detection switch 42 presents the ON state (detection state) only when both of the right door 26 and the front door 28 are in the close state.

Incidentally, when the front door 28 is closed from the state illustrated in FIGS. 11 and 15 (the state in which the right door 26 is closed and the front door 28 is open), the moving member 44 is moved leftward by the second contact guide section 86 of the second lever 48. Also, the leftward movement as mentioned above is guided by the first contact guide section 80 of the first lever 46, and thus the moving member 44 is moved smoothly to the detection position. Further, when the right door 26 is closed from the state illustrated in FIGS. 12 and 16 (the state in which the right door 26 is open and the front door 28 is closed), the moving member 44 is moved downward by the first contact guide section 80 of the first lever 46. Also, the downward movement as mentioned above is guided by the second contact guide section 86 of the second lever 48, and thus the moving member 44 is moved smoothly to the detection position. Furthermore, when the right door 26 and the front door 28 are simultaneously closed from the state illustrated in FIGS. 10 and 14 (the state in which the right door 26 and the front door 28 are both open), the moving member 44 is moved downward and leftward by the first contact guide section 80 of the first lever 46, and the second contact guide section 86 of the second lever 48, respectively. Also, the movements as mentioned above are guided by the first contact guide section 80 of the first lever 46 and the second contact guide section 86 of the second lever 48 mutually. In addition, a fall of the moving member 44 is prevented by means of the fall preventer 90 of the holding member 52. Consequently, the moving member 44 can be moved smoothly to the detection position.

As described above, the moving member 44 can be moved freely within the planar area X, and be moved smoothly to the detection position. In other words, the direction of movement of the moving member 44 is not limited to a specific direction, and the moving member 44 can be moved smoothly to the detection position by following a plurality of routes. In particular, even if the right door 26 and the front door 28 are simultaneously closed, the moving member 44 can be reliably moved to the detection position without causing damage to the members.

Meanwhile, when the right door 26 and the front door 28 are opened, the open and close detection device 40 operates in a direction opposite to that when the doors are closed. In other words, the moving member 44 is moved upward and rightward by the biasing force of the extension coil spring 50, and also, the movements as mentioned above are guided appropriately by the first contact guide section 80 of the first lever 46 and the second contact guide section 86 of the second lever 48. By virtue of the above feature, the moving member 44 can be moved smoothly to the lower right position, the upper left position, and the initial position, for example, from the detection position.

As can be seen, according to the present embodiment, the moving member 44 can be moved freely within the planar area X, and also, the movement of the moving member 44 by one of the levers 46 and 48 is guided by the contact guide section 80, 86 of the other one of the levers 46 and 48. Therefore, the moving member 44 can be smoothly led to the detecting position, while the levers 46 and 48 are kept from exerting reaction forces on each other. Therefore, a single detection switch 42 can appropriately detect the open and close state of the two open and close members 26 and 28.

Note that in the above-described embodiment, the right door 26 and the front door 28 are exemplified as the first open and close member and the second open and close member. However, the first open and close member and the second open and close member can be provided on other side surfaces of the apparatus body 12, for example, on the left side surface and the front surface. Further, in the above-described embodiment, a rotary-type open and close member, which is opened by being rotated with a lower end portion being a pivot point, is exemplified. However, the first open and close member and the second open and close member may be open and close members of a drawer type, which are opened by being pulled out straight to the right side, front side, etc.

Furthermore, in the above-described embodiment, as the image forming apparatus 10, the multifunction peripheral in which a copier, a facsimile machine, a printer, and the like are combined is exemplified. However, the image forming apparatus 10 may be any of a copier, a facsimile machine, and a printer, for example, or a multifunction peripheral in which at least two of the aforementioned devices are combined. Also, the image forming apparatus 10 may be a monochrome machine.

Moreover, the open and close detection device 40 can be applied to devices other than the image forming apparatus 10, as long as those devices include a first open and close member and a second open and close member provided to be openable and closable in directions orthogonal to each other.

Note that the specific numerical values and shapes of components, etc., described above are merely examples, and can be modified as appropriate, if needed, according to the product specifications.

What is claimed is:

1. An open and close detection device which detects an open and close state of a first open and close member and a second open and close member provided to be openable and closable in directions orthogonal to each other, the open and close detection device comprising:

a detection switch;

a moving member including a first contact surface and a second contact surface arranged in directions orthogonal to each other;

a holding member which holds the moving member to be movable within a planar area including an initial position at which the detection switch is not pressed, and a detection position at which the detection switch is pressed to present a detection state;

a first lever which includes a first contact guide section opposed to the first contact surface, and is displaced in association with an opening and closing operation of the first open and close member;

a second lever which includes a second contact guide section opposed to the second contact surface, and is displaced in association with an opening and closing operation of the second open and close member; and a biasing member which biases the moving member in a direction from the detection position toward the initial position, and brings the first contact surface into contact with the first contact guide section, and also brings the second contact surface into contact with the second contact guide section, wherein:

the first lever presses, in accordance with the closing operation of the first open and close member, the first contact surface by the first contact guide section, thereby moving the moving member in a first direction, and when the second lever is to move the moving member, guides the moving member in a second direction orthogonal to the first direction by the first contact guide section;

the second lever presses, in accordance with the closing operation of the second open and close member, the second contact surface by the second contact guide section, thereby moving the moving member in the second direction, and when the first lever is to move the moving member, guides the moving member in the first direction by the second contact guide section; and when the first open and close member and the second open and close member are both in the close state, the moving member is moved to the detection position and the detection switch presents the detection state.

2. The open and close detection device according to claim 1, wherein an end portion on one side of the biasing member is attached to the moving member, and an end portion on the other side of the biasing member is attached to the holding member.

3. The open and close detection device according to claim 1, wherein:

the moving member includes a third contact surface at a side surface that is on a same side as the first contact surface; and the holding member includes a guide section which is brought into contact with the third contact surface and guides movement of the moving member in the second direction.

4. The open and close detection device according to claim 1, wherein the holding member includes a fall preventer which prevents a fall of the moving member in a direction orthogonal to a direction of movement of the moving member.

5. The open and close detection device according to claim 1, wherein:

the moving member includes an opening penetrating in a thickness direction thereof, and the holding member includes a protrusion which has a cross-sectional area smaller than a cross-sectional area of the opening, and is inserted into the opening.

6. The open and close detection device according to claim 5, wherein each of the opening and the protrusion has a rectangular cross-sectional shape having two sides parallel to the first contact surface and two sides parallel to the second contact surface.

7. An image forming apparatus comprising:

a first open and close member and a second open and close member provided to be openable and closable in directions orthogonal to each other; and the open and close detection device according to claim 1 which detects an open and close state of the first open and close member and the second open and close member.

* * * * *